Aug. 27, 1968

E. J. CHALFANT ET AL 3,398,966

SELF-TIGHTENING CHUCK

Filed Feb. 18, 1966

INVENTOR.
Edward J. Chalfant
Heinrich H. Frank

Aug. 27, 1968   E. J. CHALFANT ET AL   3,398,966
SELF-TIGHTENING CHUCK
Filed Feb. 18, 1966   2 Sheets-Sheet 2
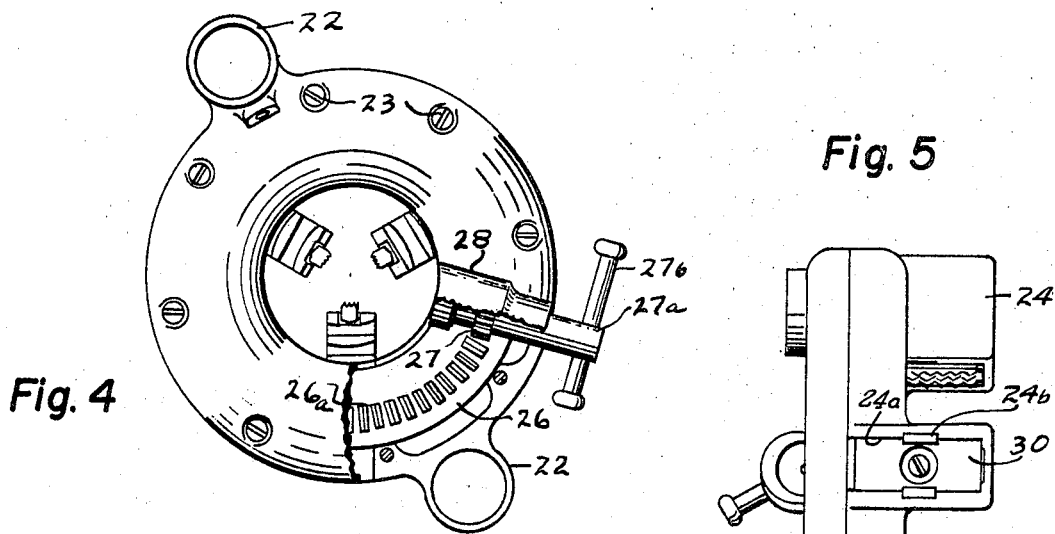
Fig. 4
Fig. 5
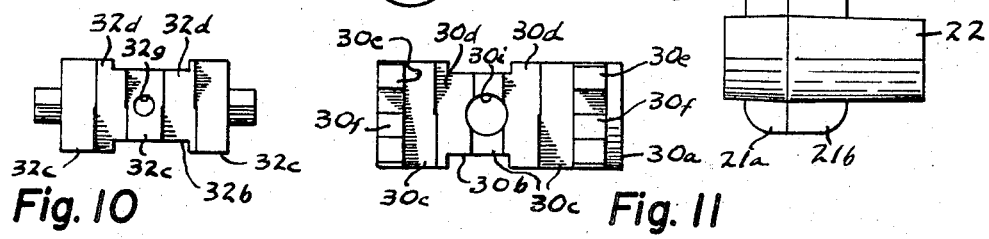
Fig. 10
Fig. 11
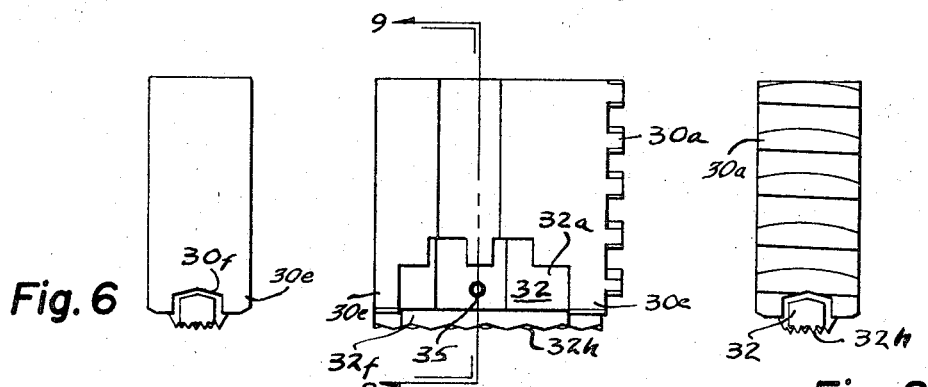
Fig. 6
Fig. 7
Fig. 8
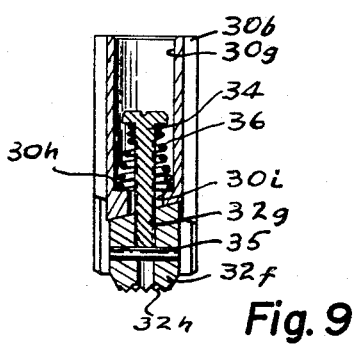
Fig. 9
INVENTOR.
Edward J. Chalfant
Heinrich H. Frank
BY
*their Atty*

United States Patent Office 3,398,966
Patented Aug. 27, 1968

3,398,966
SELF-TIGHTENING CHUCK
Edward J. Chalfant, Elyria, and Heinrich H. Frank, Amherst, Ohio, assignors to Emerson Electric Co., St. Louis, Mo., a corporation of Missouri
Filed Feb. 18, 1966, Ser. No. 528,486
5 Claims. (Cl. 279—116)

ABSTRACT OF THE DISCLOSURE

A chuck has ways in which gripping jaws are disposed and advanced into engagement with a work piece by a scroll plate. Each jaw is provided with a main body which has an end seat formed by oppositely inclined surfaces. The work engaging position has surfaces complementary to those on the body and is held against the seat on the body by a screw and spring. When the work piece encounters resistance to its rotation the friction on the gripping part of the jaw causes it to move on the body seat which tightens the jaw against the work piece.

---

This invention relates to improvements in article or work gripping devices such as chucks and more particularly to a chuck of the type where the holding or driving of the articles causes the gripping power to increase with an increase in resistance to the applied torque. It will be described in conjunction with a portable threading machine but is not necessarily limited thereto.

Heretofore self-engaging chucks or gripping devices have been proposed which have usually comprised one or more jaw members that tilted when subjected to resistance to torque as shown in Patents 1,844,616, 1,918,439 and 2,811,366. The present invention contemplates a chuck having two or more gripping jaws, which, when torque is applied to the chuck engaged article, partake of a sliding action resulting in a radial movement of the gripping portion of said jaws to cause the article to be gripped more securely. Although chucks having sliding jaws have been proposed, as shown in Patent 2,754,528 there have been certain disadvantages which the present invention overcomes. For instance, in the patent cited immediately above only one jaw slides at a time and in only one direction. When this happens the work is thrown off center and this is undesirable. In the tilt type jaws, the rocking action had a tendency to dent the article.

By the present invention it is possible to provide two or more (the usual number being three) jaws, each of which automatically moves inward radially without tilting when the torque resistance between the jaws and the work increases.

Still other advantages of the invention and the invention itself will become more apparent from the following description of some embodiments thereof, which description is illustrated by the accompanying drawings and forms a part of this specification.

In the drawings:

FIG. 4 is a view similar to FIG 3 from the opposite side;

FIG. 5 is a side elevational view thereof;

FIGS. 6, 7 and 8 are elevational views on a larger scale of one of the chuck jaws, FIG. 6 being an end view; FIG. 7 a side view, and FIG. 8 a view from the opposite end to FIG 6;

FIG. 9 is a section taken from the line 9—9 of FIG. 7;

FIGS. 10 and 11 are end views of the meeting faces of the jaw parts; and

Briefly, the invention contemplates a chuck body or housing provided with radial ways in which slidable jaws are mounted, the jaws being in engagement with a scroll plate for adjusting the radial position thereof. Each of the jaws is comprised of a base part, which is engaged in the ways and with the scroll plate, and a slightly narrower work-engaging part which is mounted on the base part, the two parts having matching slanting engaging surfaces whereby, when the work-engaging part moves laterally relative to the other part, it moves in radially toward the work and increases its gripping power thereon.

Figure 1:
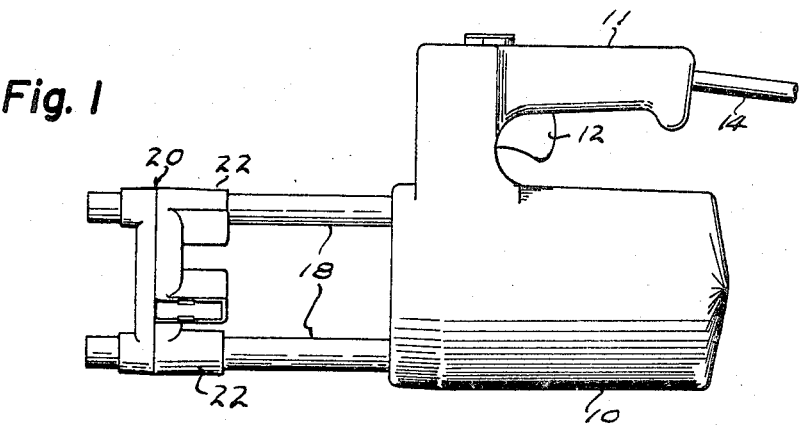
FIG. 1 is an elevational view of a power threading device with the chuck of the invention mounted thereon.
Figure 2:
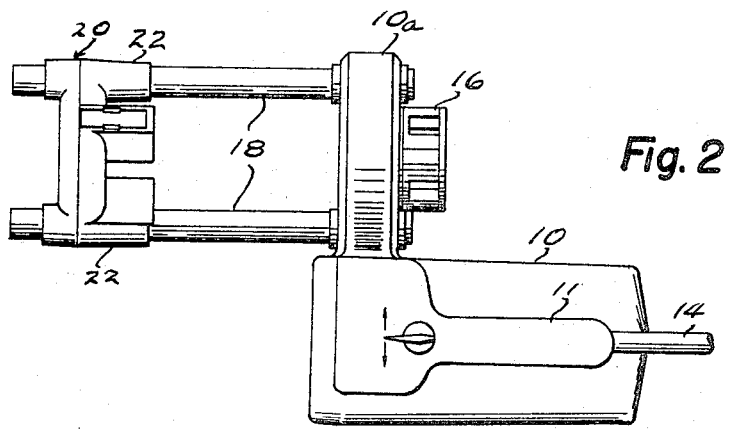
FIG. 2 is a plan view thereof.

As best shown in FIGS. 1 and 2, there is illustrated, for the purpose of this description, a form of portable power drive which includes a motor housing 10 having a handle 11 and a switch trigger 12. Power is supplied to the motor through a cord 14 to drive the motor which in turn actuates a gear train, not shown, in the end of the motor housing. A laterally extending portion 10a of the housing carried a ring gear, not shown, which is driven by the gear train and it in turn rotates a removable threading die 16. The ring gear housing supports a pair of guide bars 18 which provide a support means for the work holder or chuck 20.

As will be apparent in this instance, the chuck holds the work and the die head revolves. The situation could be reversed and the chuck revolved and the tool for performing the work, stand still.

The chuck 20 is provided with a pair of hollow bosses 22 extending from opposite sides which encircle the guide bars 18 and enable the chuck to slide on the guide bars toward the die head.

With such a device a pipe or article to be threaded is inserted between the chuck jaws until it projects toward the die head beyond the chuck the desired amount. The chuck jaws are then clamped to the work and the motor and its die head slid into engagement with the end of the pipe. The motor is then energized to rotate the die head. As pipe is threaded, the chuck slides on the guide bars toward the die head until the motor is stopped. This may be done manually or automatically. In this case the chuck holds the work from turning.

Figure 3:
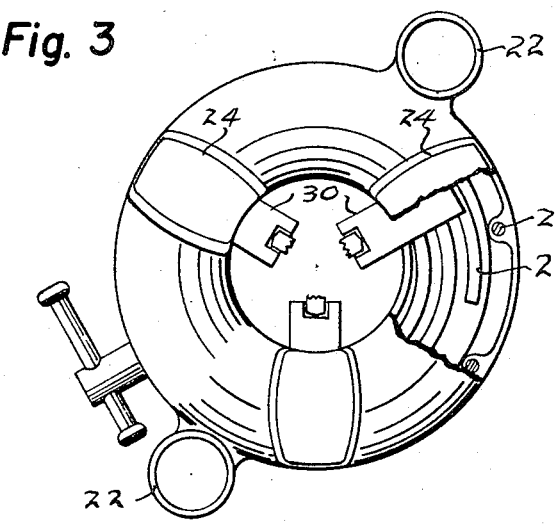
FIG. 3 is an elevational view on an enlarged scale of the chuck removed from the machine of FIGS. 1 and 2, with a portion of the housing broken away to display the interior construction.

As best illustrated in FIGS. 3, 4 and 5, the chuck includes a housing which is made in two parts, 21a and 21b, held together by screws 23. The housing part 21b is provided with jaw holding bosses 24 extending from the side of the housing and formed with rectangular radially extending channels 24a in which gripping jaws 30 are slidably disposed.

As best shown in FIG. 4, a scroll ring 26 is rotatably mounted in the housing, being provided with gear teeth 26a on one side and with spiral lands 26b on the other side. The ring is rotated by a pinion gear 27 carried by a shaft 27a and mounted in a boss 28 on the side of the housing 21a, a handle 27b being provided for rotating the shaft.

The gripping jaws are each slidably disposed in the channels 24a, which may be provided with wear plates 24b when the housing is made of a soft metal, providing ways for the jaws.

FIGS. 6 to 8 inclusive are exterior views of the gripping jaws, which are generally rectangular parallelepiped bodies with one edge smooth and the other formed with curved lands 30a. The lands 30a engage with the land 26b of the scroll plate, which, when turned, advances the jaws radially inward or outward relative to the chuck axis. The sides of the jaws are provided with shallow channels 30b which engage with the wear plates 24b.

The inner end of each jaw body is provided with a seat which supports a work-gripping member 32.

The seat extends across and through the jaw body and is comprised of a plurality of adjacent oppositely inclined rectangular planes 30c and 30d, each of which slants in an opposite direction relative to the adjacent seat, as shown in FIG. 11, and extends transversely across the body. At the end extremities, the body is provided with a pair of flanges 30e which are notched at 30f to provide clearance for the gripping jaw ends.

As best shown in FIG. 9, the body is also provided with a bore 30g, opening through the end opposite to the seat and having the inner end closed by a wall 30h. The wall is provided with an opening 30i which opens through the wall into the center seat 30c. This opening is sufficiently large that a holding screw may extend through it for holding the work-gripping member in position.

The work-gripping member or jaw, FIGS. 7, 9 and 10, comprises a body 32a having a seat also formed with adjacent oppositely inclined planes 32c and 32d which are complementary to the planes 30c and 30d on the body 30. It is slightly narrower transversely than the body 30. The walls are relieved at 32b to provide clearance for the ways 24b. The parts of the cam planes which extend above the adjacent planes are relieved slightly on their vertical sides to provide a slight clearance with the cam parts on the opposite piece and thus prevent any binding where they extend alongside each other. The end of the jaw is formed with a work-gripping surface 32f, the ends of which extend outboard of the jaw into the notches 30f, the notches being sufficiently large that these ends do not have contact with the walls of the notch. The jaw is formed with a threaded bore 32g into which a holding screw 34 is threaded, the head and stem of the screw being disposed in the bore 30g and the stem extending freely through the opening 30i, into the bore 32g and contacting a roll pin 35 which extends transversely across the jaw through the bore 32g and acts as a stop for the screw.

A conical spring 36 is disposed around the stem with the small end engaging the head of the screw and the large end engaging the wall 30h around the hole 30i. The spring is under compression and hence presses the stem upward, as viewed in FIG. 9, holding the jaw with its seat surfaces in engagement with the body seat surfaces. Since the seat planes or surfaces slant in opposite directions, the jaw rests in a centered position relative to the base, as shown in FIG. 9. Inasmuch as the discrete seat portions of the work-engaging part of the jaw extend between the like portions on the base, the sides of the seat parts on the body engage with the sides of the seat parts on the gripping member, preventing relative movement between the jaw and base in a longitudinal direction.

The end of the jaw is formed with a plurality of sharp teeth 32h which may be of diamond configuration designed to prevent the jaw from sliding on the article being held in all directions, once the article is clamped.

In operation, the proper die being inserted in the machine, the device is placed over the end of a pipe or rod with the end of the pipe or rod extending beyond the jaws toward the die. The handle 27b is used to turn the shaft 27a and the gear 27 to rotate the scroll plate 26 which advances the work holder jaws into contact with the pipe. As previously pointed out, the interlocking nature of the seats on the jaw parts prevents any movement of these parts relative to each other in a longitudinal direction and at this time the springs 36 hold the gripping parts centralized relative to the body parts. When this preliminary tightening of the jaws occurs, the gripping surfaces 32h are forced into close engagement with the article. The motor housing with its die is then moved toward the pipe or rod until the pipe or rod enters between the chasers. The motor is then energized and the die head is rotated and starts cutting the thread.

As the thread cutting proceeds and the resistance to the torque applied to the pipe become larger, the jaws 32 may move laterally on the base portion 30. Such lateral movement causes the contact planes to slide over each other and this causes the planes on the gripping part to ride up on the planes of the body part, the gripping part therefore moves inwardly into firmer engagement with the pipe.

Because the two sets of planes forming the seats slant in opposite directions, the jaws move inwardly regardless of the direction in which the chuck is turned. The angle of inclination of the jaws determines the degree of inward movement. Since each of the jaws has the same movement, they all move in equally and the article is not thrown off center relative to the die head.

Figures 12, 13:
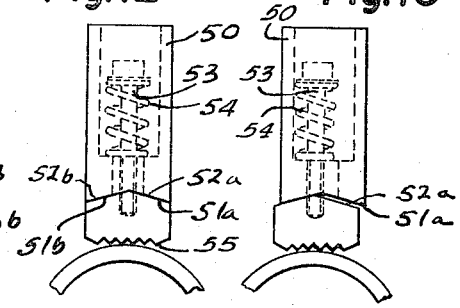
FIGS. 12 and 13 are diagrammatic views of a simplified version of the gripping jaws.

A simplified version of the jaws is shown diagrammatically in FIGS. 12 and 13. In this instance, the main jaw body 50 is provided with an end seat which comprises two intersecting planes 51a and 51b slanting in opposite directions from a centerline extending longitudinally of the jaw. The work-gripping part of the jaw is likewise provided with two oppositely slanting faces 52a and 52b. The two jaw parts are held together by a screw 53 having a spring 54 in the same manner as previously described for the other embodiment. The gripping part is provided with the diamond configuration of work-gripping surface 55.

FIG. 12 shows the jaw in engagement with the work at the start of an operation and FIG. 13 shows the jaw moved laterally due to the resistance to torque to cause the work-gripping portion to move toward the workpiece as it moves laterally.

It is apparent that the first embodiment described has several advantages over the second in that in the first embodiment there is contact with the surfaces from one side entirely across the jaw, whereas in the second a gap appears on one side, causing a decrease in stability. In addition, the jaw can move longitudinally the only deterrent being the engagement of the screw shank which holds the work-engaging part in position with the sides of the opening in the base through which it extends.

Having thus described the invention in some embodiments thereof, it is understood that variations may be made from those shown without departing from the spirit of the invention as defined by the appended claims.

We claim:

1. A chuck having a plurality of radially extending article engaging jaws, each jaw including a first portion comprising a base and a second article engaging portion slidably mounted on the base portion with the engaging surfaces being formed to cause said article engaging portion to partake of radial movement when the second portion is moved on the first portion, each of said engaging surfaces being in the form of a plurality of surfaces inclined in opposite directions with the surfaces on the base portion being a complement of the surfaces on the second portion.

2. A chuck as described in claim 1, wherein said oppositely inclined surfaces cross over opposite to each other in the mid-portion of said jaw in balanced relation.

3. A chuck as described in claim 2, wherein means is provided for holding said surfaces in the one portion in contact with the other portion.

4. A chuck as described in claim 2, wherein there is provided a housing and said jaws are mounted in ways in the housing and said base portion engages the sides of the ways and said work gripping portion is out of contact with the ways and arranged to move laterally relative to the base portion.

5. A chuck as described in claim 4, wherein said base portion is formed with a bore and has a wall in the end of the bore, said wall being formed with an opening and said holding means comprises a member disposed in the bore and extends freely through said opening and is secured in said second portion and spring means is associated with said member and forces said member toward the end of said base portion opposite to said slanting surfaces.

References Cited

UNITED STATES PATENTS

| 1,509,061 | 9/1924 | Hardwicke | 279—56 X |
| 1,711,769 | 5/1929 | Bell et al. | 279—123 |
| 1,794,511 | 3/1931 | Bush | 279—123 |
| 2,523,374 | 9/1950 | Jensen | 279—123 |

ROBERT C. RIORDON, *Primary Examiner.*

J. C. PETERS, *Assistant Examiner.*